United States Patent
Davis

(10) Patent No.: US 11,291,972 B2
(45) Date of Patent: Apr. 5, 2022

(54) HIGH EFFICIENCY HYDROGEN OXYGEN GENERATION SYSTEM AND METHOD

(71) Applicant: Davis Technologies, LLC, Reno, NV (US)

(72) Inventor: Edward L. Davis, Portland, OR (US)

(73) Assignee: Davis Technologies, LLC, Reno, NV (US)

( * ) Notice: Subject to any disclaimer, the term of this patent is extended or adjusted under 35 U.S.C. 154(b) by 0 days.

(21) Appl. No.: 16/887,533

(22) Filed: May 29, 2020

(65) Prior Publication Data
US 2020/0376459 A1    Dec. 3, 2020

Related U.S. Application Data

(60) Provisional application No. 62/854,217, filed on May 29, 2019.

(51) Int. Cl.
*B01J 19/08*    (2006.01)
*B01J 19/12*    (2006.01)

(52) U.S. Cl.
CPC ........... *B01J 19/088* (2013.01); *B01J 19/121* (2013.01); *B01J 2219/0849* (2013.01);
(Continued)

(58) Field of Classification Search
CPC .................... B01J 19/088; B01J 19/121; B01J 2219/0877; B01J 2219/0849; B01J 2219/12; B01J 2219/0854
(Continued)

(56) References Cited

U.S. PATENT DOCUMENTS 3,954,592 A * 5/1976 Horvath .................... C25B 9/19
                                              204/229.7
3,980,053 A * 9/1976 Horvath ............. F02M 21/0206
                                                123/3
(Continued)

FOREIGN PATENT DOCUMENTS

WO    WO-2007049507 A1 * 5/2007 ............... C25B 1/04
WO    2010120810 A1    10/2010

OTHER PUBLICATIONS

Laser Focus World Mid-IR Lasers: Power and pulse capability ramp up for mid-IR lasers May 2, 2014. Retrieved from <https://www.laserfocusworld.com/lasers-sources/article/16550254/midir-lasers-power-and-pulse-capability-ramp-up-for-midir-lasers>.
(Continued)

*Primary Examiner* — Nicholas A Smith
*Assistant Examiner* — Colleen M Raphael
(74) *Attorney, Agent, or Firm* — DeLio Peterson & Curcio LLC; David R. Pegnataro

(57) ABSTRACT

A method of dissociating hydrogen and oxygen from a water molecule comprises isolating a predetermined volume of water between concentrically-mounted electrodes; applying a magnetic field across the predetermined volume of water, the magnetic field focused radially and attracting diametrically across the electrodes; exciting water molecules in the isolated volume of water to a resonant harmonic frequency; and synchronously applying short burst high voltage, high frequency AC pulse packets to the isolated volume of water to create an electric field. The AC pulse packets have a burst width of up to 1 millisecond and a voltage up to about 10 MV, and generate an oscillating electromotive force which acts on the excited water molecules to dissociate hydrogen and oxygen.

18 Claims, 14 Drawing Sheets

(52) U.S. Cl.
CPC ............... *B01J 2219/0854* (2013.01); *B01J 2219/0877* (2013.01); *B01J 2219/12* (2013.01)

(58) Field of Classification Search
USPC .................. 205/339; 204/157.5, 157.52; 422/186–187
See application file for complete search history.

(56) References Cited

U.S. PATENT DOCUMENTS

| | | | |
|---|---|---|---|
| 4,421,474 A | 12/1983 | Meyer | |
| 4,613,304 A | 9/1986 | Meyer | |
| 4,826,581 A | 5/1989 | Meyer | |
| 4,936,961 A | 6/1990 | Meyer | |
| 5,149,407 A | 9/1992 | Meyer | |
| 6,245,309 B1* | 6/2001 | Etievant | C01B 3/323 423/248 |
| RE45,415 E * | 3/2015 | Senkiw | A01G 31/02 210/739 |
| 2004/0200731 A1* | 10/2004 | Sullivan | H01M 10/44 205/628 |
| 2004/0203166 A1* | 10/2004 | Sullivan | C25B 9/17 436/161 |
| 2005/0023128 A1* | 2/2005 | Keras | B01D 53/32 204/164 |
| 2006/0060464 A1 | 3/2006 | Chang | |
| 2011/0220516 A1* | 9/2011 | Finfrock | C25B 1/04 204/228.6 |

OTHER PUBLICATIONS

Mackay Alternating Current (AC) Dec. 12, 2018. Retrieved from <https://web.archive.org/web/20181015000000*/http://solar.bnsc.rl.ac.uk/sb99/people/DMackay/ac.html>.

Wikipedia "Electric Heating" Oct. 17, 2018. Retrieved from <https://en. wikipedia.org/w/index.php?title=Electric_heating&oldid=864543750>.

Kristiansen, M. and Hatfield, L.L., "High Voltage Water Breakdown Studies", Technical Report Jan. 21, 1998 038, Texas Tech University, Pulsed Power Lab, Department of Electrical Engineering, Jan. 1998. [paper, PDF]. [retrieved on Jun. 15, 2020]. Retrieved from the Internet: <http://www.dtic.mil/dtic/tr/fulltext/u2/a335128.pdf>.

Mook, W., "How Much Electricity Can Be Produced With 1L of Hydrogen Gas/Liquid" [online], [retrieved on Jun. 15, 2020], Retrieved from the Internet: <https://www.quora.com/How-much-electricity-can-be-produced-with-1L-of-hydrogen-gas-liquid?share=1 >.

Rosenkranz, P.W., "Water Vapor Microwave Continuum Absorption: A Comparison of Measurements and Models", Radio Science, vol. 33, No. 4, pp. 919-928, Jul.-Aug. 1998, Research Laboratory of Electronics, Massachusetts Institute of Technology, Cambridge, [paper, PDF] [retrieved on Jun. 15, 2020], Retrieved from the Internet: <https://agupubs.onlinelibrary.wiley.com/doi/pdf/10.1029/98RS01182>.

Dai, Z., Su, Q., Lu, D., Sun, L., and Liu, W., "A Combined Experimental and Theoretical Study on the Terahertz Vibrations of Water Vapors", Spectrochimica Acta Part A: Molecular and Biomolecular Spectroscopy, vol. 214, May 5, 2019, pp. 277-284. [paper, PDF]. [retrieved on Jun. 17, 2020] Retrieved from the Internet <https://www.sciencedirect.com/science/article/abs/pii/S1386142519301209>.

Stuve, E.M., "Ionization of Water in Interfacial Electric Fields:An Electrochemical View", Chem. Phys. Letters 519-520 (2012) 1-17. [paper, PDF]. [retrieved on Jun. 17, 2020], Retrieved from the Internet: <https://www.sciencedirect.com/science/article/abs/pii/S0009261411011511>.

Chaplin, M., "Water Absorption Spectrum", Water Structure and Science, [online]. [retrieved on 2020-06-15], Retrieved from the Internet: <http://www1.lsbu.ac.uk/water/water_vibrational_spectrum.html#be>.

"What is the Approximate Size of a Water Molecule? How Was it First Measured?" [online]. [retrieved on Jun. 15, 2020], Retrieved from the Internet: <https://www.quora.com/What-is-the-approximate-size-of-a-water-molecule-How-was-it-first-measured>.

"Harmonic Oscillator", [online]. [retrieved on Jun. 15, 2020]. Retrieved from the Internet: <http://universe-review.ca/R15-33-harmonics.htm>.

Flaud, J.M., Camy-Peyret, C., and Toth, R.A. Water Vapour Line Parameters from Microwave to Medium Infrared (An Atlas of H2 16O, H2 17O, and H2 18O Line Positions and Intensities Between 0 and 4350cm-1). Elsevier Ltd. (1981).

* cited by examiner

HIGH EFFICIENCY HYDROGEN OXYGEN GENERATION SYSTEM AND METHOD

BACKGROUND OF THE INVENTION

1. Field of the Invention

The present invention relates generally to a high efficiency water reformer system that generates hydrogen and oxygen from water, and more specifically, to a hydrogen and oxygen generation system which utilizes pulsed High Voltage emf to dissociate hydrogen and oxygen from prestressed water molecules to produce hydrogen on-demand.

2. Description of Related Art

All materials have three phases (solid, liquid and gas), but water has many unique properties. Solid water (ice) floats instead of sinks unlike other materials, because the density of solid water is lower than the density of liquid water. Moreover, water is an extremely tiny molecule having a disproportionately large electric dipole moment.

Conventional prior art hydrogen and oxygen generation systems require electrolysis, which is a very low efficiency process consuming far more energy than could ever be recuperated in fuel cells or internal combustion engines.

Electrolysis is the chemical decomposition of water produced by passing a low voltage current through the liquid water with an added electrolyte to produce hydrogen and oxygen, which can then be burned in a combustion engine or fed into a fuel cell to generate energy. Conventional electrolysis systems require electrolytes (e.g., sulfuric acid) to be added to the water, then current is passed through the water until enough energy is supplied to dissociate the hydrogen ions from the oxygen ions, which then combine with each other to become diatomic $H_2$ and $O_2$.

Oxygen is attracted to the Anode (+) and Hydrogen is attracted to the Cathode (−) terminal. As an example, FIG. 1 shows the process used in a typical electrolytic cell.

Water is a polar molecule. The $H_2O$ molecule has a net dipole moment which is a vector sum. Oxygen has a lone pair of electrons in its outer shell causing the structure of the $H_2O$ molecule to be bent (VSEPR theory developed by Gillespie-Nyholm); therefore, the vectors representing the dipole moment of each H—O bond sum instead of cancelling out.

The water molecule diagram in FIG. 2 illustrates the magnitude and direction of the dipole moment. The difference in electronegativity between water and hydrogen is 1.2 e for each of the H—O bonds. The oxygen is the more electronegative atom; therefore, it exerts a greater pull on the shared electrons. In chemistry, the dipole moment points from the center point between the two hydrogen atoms toward the oxygen atom. The dipole moment is calculated by multiplying the distance between the oxygen and hydrogen atoms by the charge difference between them and then finding the components of each that point in the direction of the net dipole moment (the angle of the molecule is 104.5°). The bond moment of O—H bond=1.5 Debye, so the net dipole moment vector sum is: $\mu=2(1.5)\cos(104.5°/2)=3\cos(52.25°)=1.8546$ Debye, where 1 Debye equals $3.34\times10^{-30}$ Cm.

Water is an incredibly small molecule when compared to other molecules. Its approximate diameter is 2.75 Angstroms; therefore, a dipole moment of 1.8546 Debye is huge for a molecule this tiny. The moment arm is almost non-existent, so the charge differential is huge compared to other molecules.

The Debye defines the dipole moment. A proton and electron 100 μm apart have a dipole moment of 4.80 D by definition:

$$\mu = (1.60\times10^{-29}C\cdot m)\left(\frac{1D}{3.336\times10^{-30}C\cdot m}\right) = 4.80D$$

According to the molecule size shown in FIG. 2, in a water molecule equivalency the average vector sum of the H charges moment arm would be $((93.9+92.8)/2)\times\cos(104.5/2)=57.02$ μm.

Calculating the dipole moment based on this moment arm, assuming charges of +1 and −1, yields: $\mu=57.02/100$ $(4.80 D)=2.737$ D Because it is known that the water molecule is 1.8546 D, using the partial charge values of Q+ and Q− or δ+ and δ− relative to a full proton and a full electron: 1.85 D/2.737 D=0.6759. Therefore, the water molecule is equivalent to roughly ⅔ of a proton charge and ⅔ of an electron charge, spaced 57 μm apart. This makes the water molecule very susceptible to stretching by a large E field. FIG. 3 represents the $H_2O$ equivalent dipole.

The energy necessary to dissociate the water molecule is illustrated in FIG. 4, using the standard quantum mechanical "Morse Potential" model.

Dissociation of the HO—H bond of a water molecule of $H_2O$ requires 118.8 kcal/mol (497.1 kJ/mol). The dissociation of the remaining hydroxyl radical requires 102.8 kcal/mol (429.9 kJ/mol). This is almost four times the theoretical minimum energy of 237.13 kJ/mole, which is the standard Gibbs free energy of formation of water.

The water molecule is so highly polarized that it lends itself to dissociation by a very strong electric field which creates a strong electromotive force (emf), stretching the molecules apart.

An electric field between charged parallel conductors is a good example of the relationship between Work and voltage.

A high voltage creates a strong force in an electric field, where $$E = \frac{V}{d}$$

(FIG. 5). The SI unit of electric field strength is N/C, where N represents Newtons and C represents Coulombs.

An electric field is also defined as the force per unit charge, $$E = \frac{F}{q},$$

so multiplying the field times the plate separation yields the work per unit charge, $$Ed = \frac{Fd}{q} = \frac{W}{q} = \Delta V,$$

which is by definition the change in voltage. So, the higher the voltage, the more Work is done.

A high enough electric field causes dissociation of water because of the strong polarization of water molecules. FIG. 6 illustrates the J-V (current-voltage characteristic, divided by area) curve for pure water. The section of the curve at position A is due to the electrode kinetics for $H_2$ and $O_2$ evolution in a low conductance solution. In this region, the current is limited by the solution resistance. The next portion of the curve (position B) represents the dissociation of the water molecules. The electric field is high enough to cause the ionization and dissociation of the water molecules into hydrogen and oxygen.

FIG. 6 illustrates the force of high voltage pulling water molecules apart. However, it should be understood by those skilled in the art that it is not necessary for any current to flow closed loop from the Voltage source. The current is merely a result of the strong emf acting on the highly polarized water molecules causing protons and electrons to break apart and begin moving. This appears to be a huge current flow, but the distance it flows is infinitesimally small, on the order of nanometers when dissociation occurs and the water molecules become gases and begin rising upward. The laws of physics are not violated. They are merely leveraged to the maximum extent to overcome the Morse Potential causing a discontinuity breaking apart the water molecules.

Prior art systems and methods for dissociating hydrogen and oxygen from water molecules for use in energy systems are inefficient and consume far more energy than could be recuperated. Therefore, a need exists for an improved hydrogen and oxygen generation system which does not use electrolysis, and which is more efficient and consumes less energy than conventional electrolysis.

SUMMARY OF THE INVENTION

Bearing in mind the problems and deficiencies of the prior art, it is therefore an object of the present invention to provide an improved hydrogen and oxygen generation system which does not use electrolysis.

It is another object of the present invention to provide an improved system for dissociating hydrogen and oxygen from water molecules for use in energy systems.

A further object of the invention is to provide a water reformer that provides hydrogen on-demand.

It is yet another object of the present invention to provide a hydrogen and oxygen generation system which utilizes pulsed High Voltage emf to dissociate hydrogen and oxygen from pre-stressed water molecules to produce hydrogen on-demand.

Still other objects and advantages of the invention will in part be obvious and will in part be apparent from the specification.

The above and other objects, which will be apparent to those skilled in the art, are achieved in the present invention which is directed in one aspect to a method of dissociating hydrogen and oxygen from a water molecule, comprising isolating a predetermined volume of water between concentrically-mounted electrodes; applying a magnetic field across the predetermined volume of water, the magnetic field focused radially and attracting diametrically across the electrodes; exciting water molecules in the isolated volume of water to a resonant harmonic frequency; and synchronously applying short burst high voltage, high frequency AC pulse packets to the isolated volume of water to create an electric field. The AC pulse packets have a burst width of up to 1 millisecond and a voltage up to about 10 MV and generate an oscillating electromotive force which acts on the excited water molecules to dissociate hydrogen and oxygen. The method may further include separating the hydrogen and oxygen in a storage chamber.

In one embodiment, the water molecules in the isolated volume of water are excited by synchronously pulsing the isolated volume of water with a 1 to 6 micron MIR laser. In another embodiment, the water molecules are excited by heating the molecules using a heating coil to a temperature up to about 90° C.

In at least one embodiment, the magnetic field may be between about 1 Tesla to about 2 Tesla, and the electric field may be between about 1 MV/mm to about 10 MV/mm.

In an embodiment, the concentrically-mounted electrodes comprise a rod having an outer diameter disposed within a pipe or tube having an inner diameter larger than the outer diameter of the rod, and the predetermined volume of water is isolated between the rod outer diameter and pipe inner diameter. A plurality of concentrically-mounted electrodes may be wired in parallel, such that each pair of pipes receives maximum voltage.

The method may comprise changing the AC pulse packet frequency in real-time using a closed loop control technique; and adjusting the AC pulse packet frequency to a resonant frequency of the water molecules. The frequency of the AC pulse packets may be varied using a PID loop to achieve convergence to maximize output.

In another aspect, the present invention is directed to a high efficiency hydrogen oxygen generation system, comprising a means to generate short burst high frequency AC pulse packets up to 1 millisecond total burst width up to 10 MV synchronized with pulses from a 1 to 6 micron MIR laser to excite a water column approximately 1 mm thick inside concentric pipe electrodes, generating an avalanche of hydrogen and oxygen gases. The system may further comprise a means to apply a magnetic field across the water column, the magnetic field focused radially and attracting diametrically across the concentric pipe electrodes.

In at least one embodiment, the magnetic field may be between about 1 Tesla to about 2 Tesla, and the short burst high frequency AC pulse packets generate an electric field between about 1 MV/mm to about 10 MV/mm.

The system may further comprise a means to change the AC pulse packet frequency and duration in real-time and adjust the frequency to the resonant frequency by utilizing a microprocessor, software, PID loop, digital potentiometers, voltage sensors, current sensors, temperature sensors, and Direct Digital Synthesizers, in a closed loop control technique and methodology.

In an embodiment, the system may further comprise a means to separate the hydrogen and oxygen gases in a storage chamber.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
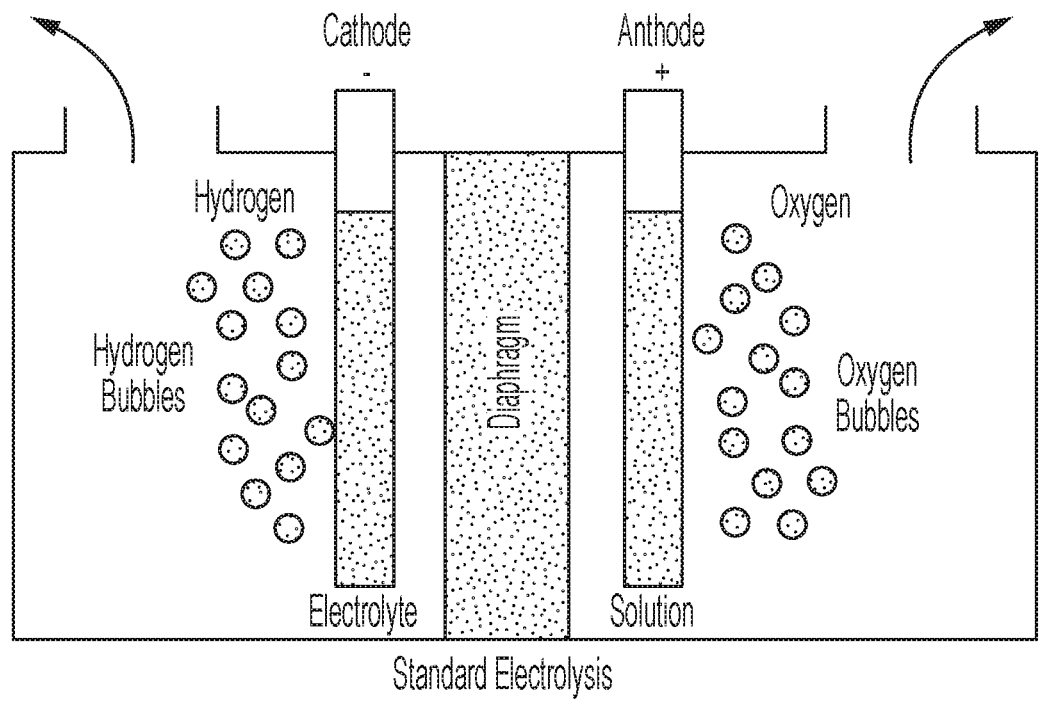
FIG. 1 depicts an exemplary electrolytic cell used to generate hydrogen and oxygen gas.
Figure 2:
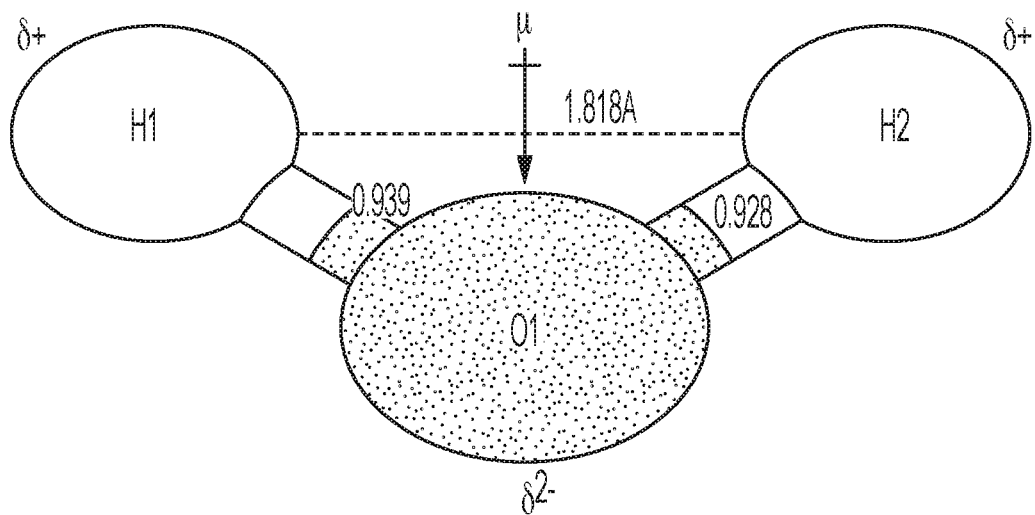
FIG. 2 depicts the dipole moment of an exemplary water molecule.
Figure 3:
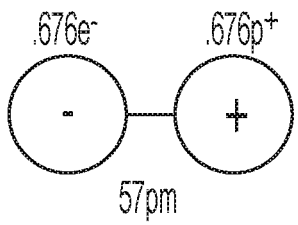
FIG. 3 depicts an equivalent H₂O molecule dipole moment.

In describing the embodiments of the present invention, reference will be made herein to FIGS. 1-18 of the drawings in which like numerals refer to like features of the invention.

Certain terminology is used herein for convenience only and is not to be taken as a limitation of the invention. For example, words such as "upper," "lower," "left," "right," "front," "rear," "horizontal," "vertical," "upward," "downward," "clockwise," "counterclockwise," "longitudinal," "lateral," or "radial", or the like, merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the words "exemplary," "illustrative," or the like, are used to mean serving as an example, instance or illustration. Any aspect or design described herein as "exemplary" or "illustrative" is not necessarily intended to be construed as preferred or advantageous over other aspects or design. Rather, the use of the words "exemplary" or "illustrative" is merely intended to present concepts in a concrete fashion.

The high efficiency hydrogen oxygen generation system (also interchangeably referred to herein as "HOGS") of the present invention uses numerous methodologies which may be used in various combinations to break the H—OH bonds in water to produce hydrogen on-demand.

The combined effects of the HOGS stimulates the dissociation rate of pre-heated or pre-stressed water utilizing extremely strong, fast switching electric fields in the presence of a strong magnetic field to stimulate multiple vibrational modes. This is done by matching the appropriate radiation frequencies with the vibrational modes of water. When a water molecule is in an excited energy state, the energy supplied by the fast switching electric field can be lower than the normal bond dissociation energy and still dissociate the molecules. Water molecules that are in an excited vibrational quantum state will then be more easily dissociated in the presence of a strong electric field, since the molecule will be above its ground state. These resonant modes exist at terahertz frequencies and in between the microwave and medium infrared frequency range.

In one embodiment, high voltage, medium or high frequency AC pulses are multiplied even higher by the tuned resonance of an inductor in series with the water capacitor. Even if the incoming voltage is only 10,000 Volts, it is possible to multiply that up to one hundred times, depending on the "Q" or Quality factor of the inductor-capacitor circuit. Since the voltage is 180 degrees out of phase between the inductor and capacitor, they still sum up to the incoming voltage, but the ionization effects of the higher voltage are enormous, causing the water molecules to dissociate into hydrogen and oxygen.

Figure 7:
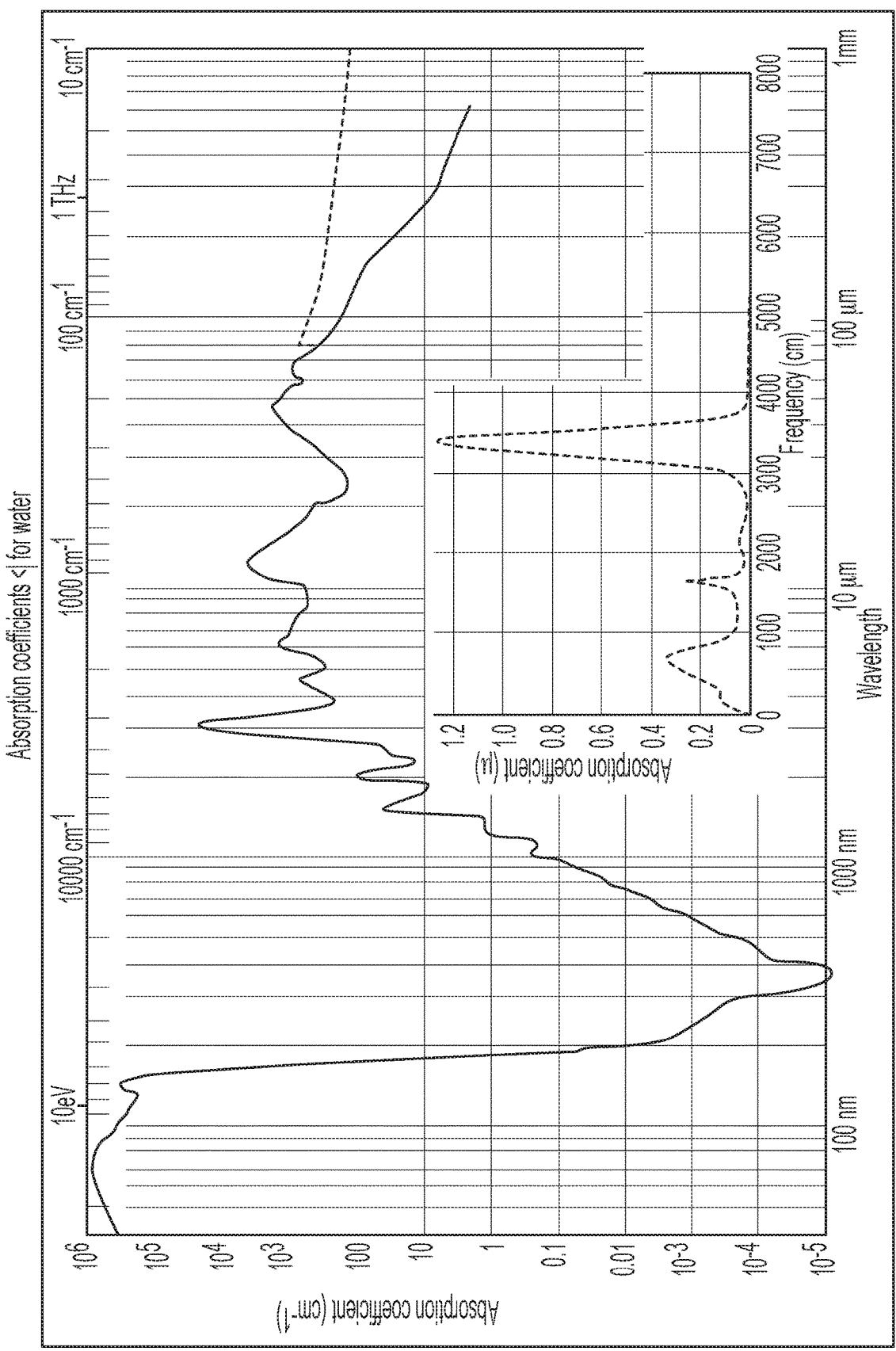
FIG. 7 depicts a graph of the absorption spectrum of liquid water.

In another embodiment, the water molecules are pre-stressed by a Medium Infrared (MIR) laser tuned to the dominant resonant frequency of the water molecules. Then, the simultaneous high voltage pulse packet causes an avalanche ripping apart of the water molecules. A pulsed laser near the 3 micron range may be used in combination with the pulsed electric field to accelerate avalanche dissociation. In an embodiment, a pulsed MIR laser at 2.94 microns is used; however, it should be understood by those skilled in the art that a laser tuned between 1 to 6 microns has been shown to be effective in some cases. The absorption spectrum of liquid water is centered around 3 microns or 3400 cm' in the MIR band, as shown in FIG. 7. In either embodiment, very strong magnets (on the order of 1 Tesla or more) are embedded in the anode and cathode of the water capacitor assembly to cause electrons and protons to flow in spiral paths, forestalling the dielectric breakdown voltage of the water capacitor and inhibiting current flow.

In another embodiment, a tuned MIR laser and/or strong magnets pre-stresses the molecules, then high voltage, medium or high frequency emf oscillations cause an avalanche ripping the molecules apart. The present invention takes advantage of another unique property of water: the unusually large electric dipole moment, which is very susceptible to large rapidly changing emf fields, especially when pre-stressed such as by using lasers and/or strong magnets.

The laser works by electromagnetic waves, "stimulating" or exciting electrons to a higher energy state, then these electrons emit an avalanche of photons all at the same frequency, creating a coherent beam of light as they fall back to their lower energy state.

Another embodiment of the present invention is similar in that it uses a Medium Infrared (MIR) laser to excite the electrons and protons in the water molecule so that they are pre-stressed, then the simultaneous high voltage electromotive force (emf) pulses create a chain reaction avalanche breakdown of the water molecules into hydrogen and oxygen.

Figure 6:
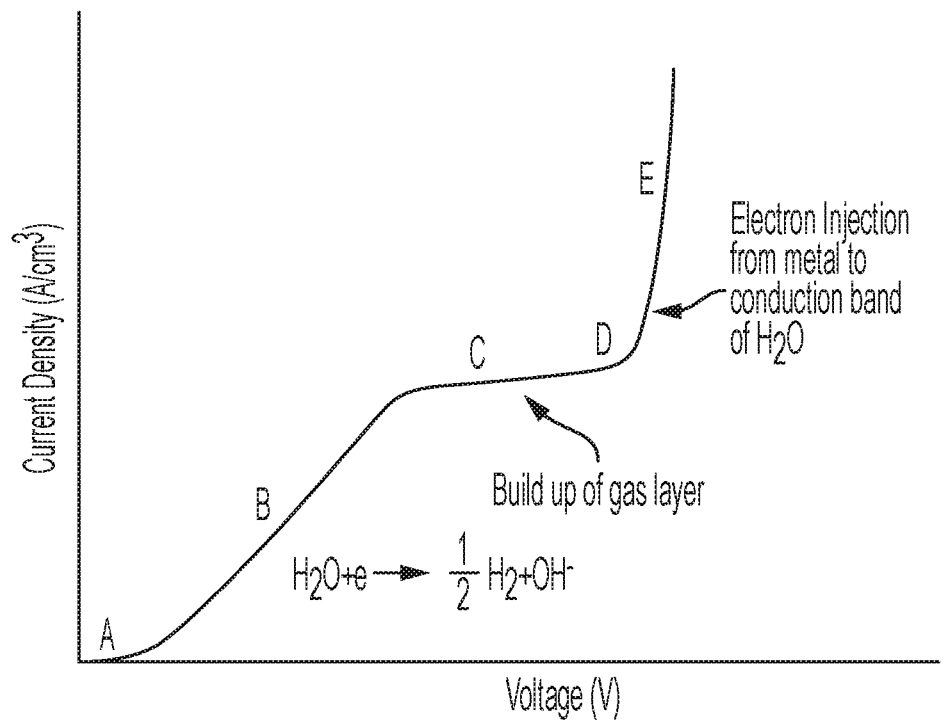
FIG. 6 depicts a graph of the J-v curve for pure water.

The graph shown in FIG. 6 shows gas products using Brass electrodes. One embodiment of the present invention uses platinum plated electrodes, which act as a catalyst to produce diatomic hydrogen and oxygen as opposed to other types of gases or ions.

Figure 5:
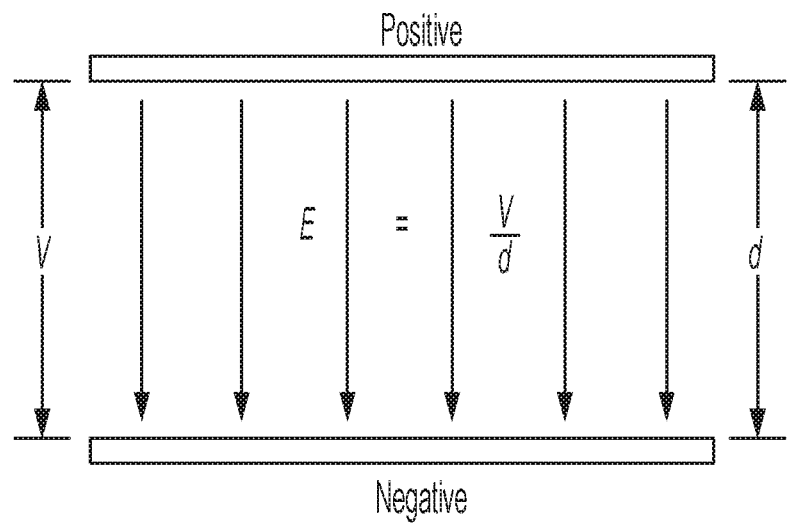
FIG. 5 depicts, in diagram form, the relationship between voltage, electric field, and work.

With reference to FIG. 5, the higher the voltage: the more work is done. However, producing high voltage is simple and efficient using a transformer. For example, an automobile ignition coil produces several thousand volts from a 12 Volt battery. A higher voltage is required for the hydrogen oxygen generation system of the present invention, but that can be affected simply by more turns on the secondary coil. Very little current is required, mostly in the form of leakage current.

Figure 4:
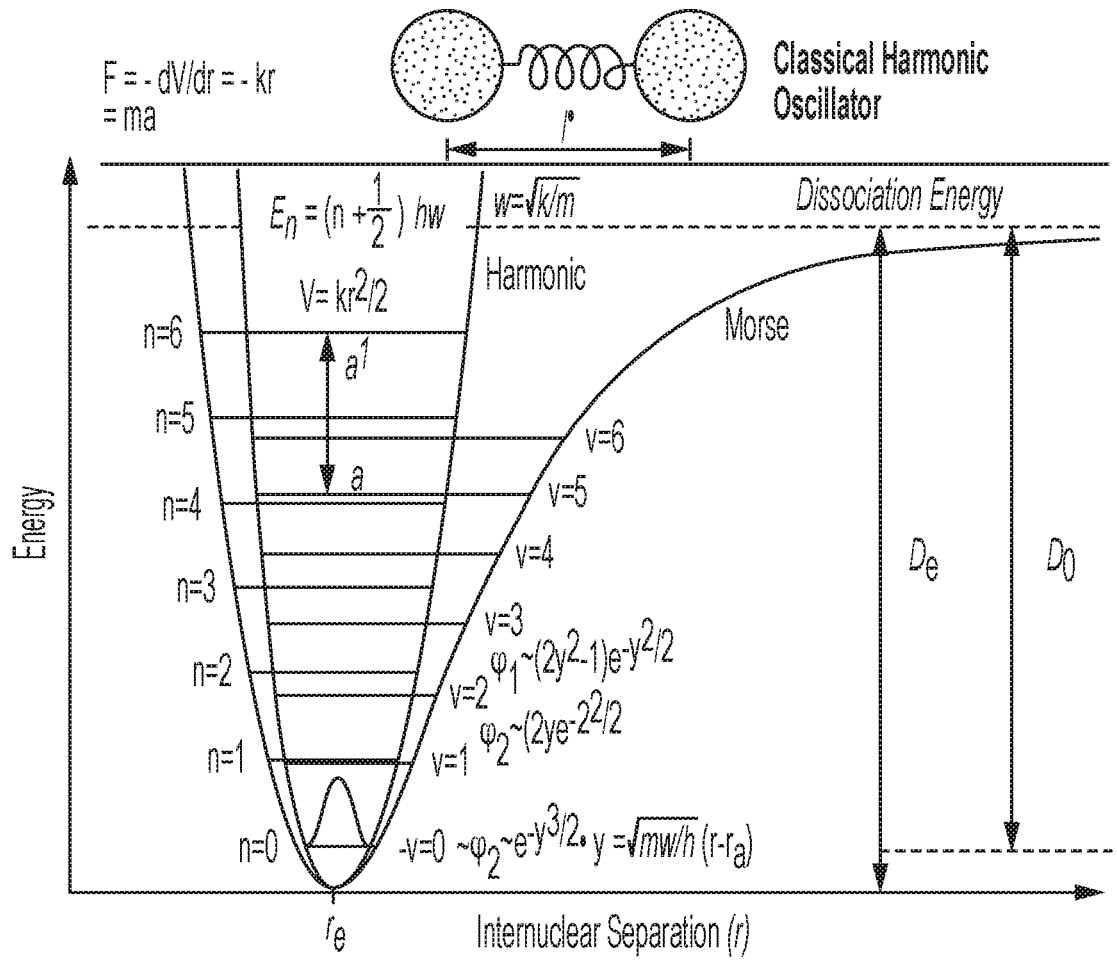
FIG. 4 depicts a graph showing the energy required to dissociate hydrogen and oxygen from an H₂O molecule.

Regarding FIG. 4, it was noted that breaking both the H—OH bond and the residual O—H bond requires (497.1+ 429.9) kJ/mol=927 kJ/mol. While this is four times the aforementioned minimum Gibbs Free Energy number, it is no problem for the high voltage pulses with MIR laser and/or strong magnetics to pre-stress the dielectric (water), as in the present invention. In one embodiment, the dissociation works without the use of a laser when the voltage pulses are high enough. The magnetics reinforce the dielectric strength and forestall dielectric breakdown, i.e., shorting out of the dielectric, and inhibit current flow. It should be understood by those skilled in the art that the entire 927 kJ/mol does not need to be delivered on a single pulse, as there are multiple pulses in each packet. For instance, the first pulse could break the H—OH bond and a subsequent pulse could break the residual O—H bond.

In an embodiment, the system of the present invention applies a very strong medium or high frequency, high voltage AC electric field across a small volume of water. This high voltage emf generates a very strong force on the polarized water molecules between the positive and negative plates or electrodes of the water capacitor. Spacing between electrodes can be anywhere from about 0.01 mm to about 10 mm. In one embodiment, the electrodes consist of a rod inside a concentric pipe with a small, approximately 1 mm gap between the electrodes that is filled with water. The electric field can be on the order of tens (10's) of kV/mm up to more than 10 MV/mm. When the system operates with electric field strengths in excess of 1 MV/mm, water molecules dissociate due to the high energy density of the fast switching electric field. In one embodiment, the electrodes are flashed with platinum, which catalyzes the monatomic oxygen and hydrogen to evolve into diatomic gases.

The momentary pulse packet (on the order of microseconds) of high voltage electric field, combined with the simultaneous MIR laser pulse, literally rips the water molecules apart causing an avalanche with this strong shock force. The system dissociates water using strong electric fields while minimizing closed loop electric current using strong magnetic fields. Very little current flows closed loop from the source, so this is a very efficient process. In fact, the process of the present invention may be up to ten times the efficiency of conventional electrolysis or more, because electrolysis requires so much current to flow. The large electromotive force literally snatches the hydrogen toward the negative electrode and the oxygen toward the positive electrode. The high voltage may be high frequency AC, so it switches direction so quickly that negligible current flows. The magnets limit current flow and slow the motion of the charged particles by forcing ions to travel in a spiral. The work is done by the tremendous emf force plus the synchronized emissions of the MIR pulsed laser stimulating the water molecules to break apart in an avalanche. The strong, approximately 1 Tesla, magnetic field forestalls Breakdown during the pulsing.

Figure 14:
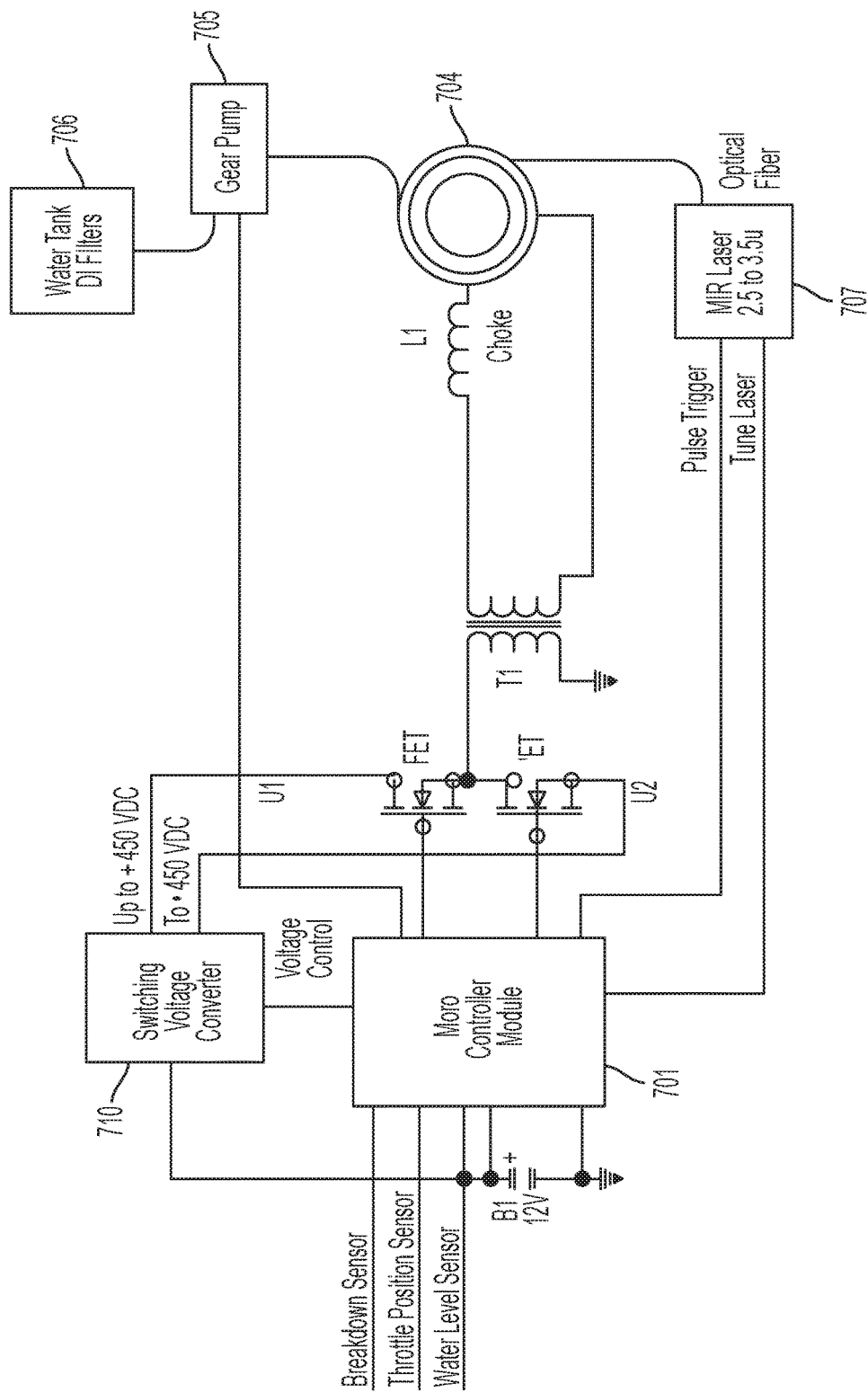
FIG. 14 depicts a schematic of exemplary circuitry for an embodiment of the high efficiency hydrogen oxygen generation system according to the present invention.

It is important to maintain the voltage very close to Breakdown Voltage without crossing over; therefore, in at least one embodiment, there is a breakdown sensor and a Voltage Control circuit and software running on the microcontroller to control the high efficiency hydrogen oxygen generation system (FIG. 14). The voltage is ratcheted up until breakdown occurs, then backed off slightly. The resistivity of Type I deionized (DI) water is 18 MΩ/m up to more than 30 MΩ/m, so it can withstand strong electric fields before breakdown occurs. Non-DI water has a much lower resistance. However, in one or more embodiments, the system of the present invention contains a deionizing filter to allow use of regular tap water.

The strong electric fields promote several mechanisms of water ionization including dissociation $$H_2O \rightarrow H^+ + OH^-$$

and quantum tunneling with a subsequent proton transfer $$H_2O \rightarrow H_2O^+ + e^-$$

$$H_2O^+ \rightarrow H^+ + OH.$$

Some of these ions migrate to an electrode surface under the influence of the applied electric field where they undergo the following redox half reactions to form their respective gases:

$$2H^+ + 2e^- \rightarrow H_{2(g)} \text{ (Cathode)}$$

$$H_2O \rightarrow \tfrac{1}{2}O_{2(g)} + 2H^+ + 2e^- \text{ (Anode).}$$

The overall reaction is therefore $$H_2O \rightarrow \tfrac{1}{2}O_{2(g)} + H_{2(g)}.$$

Figure 8:
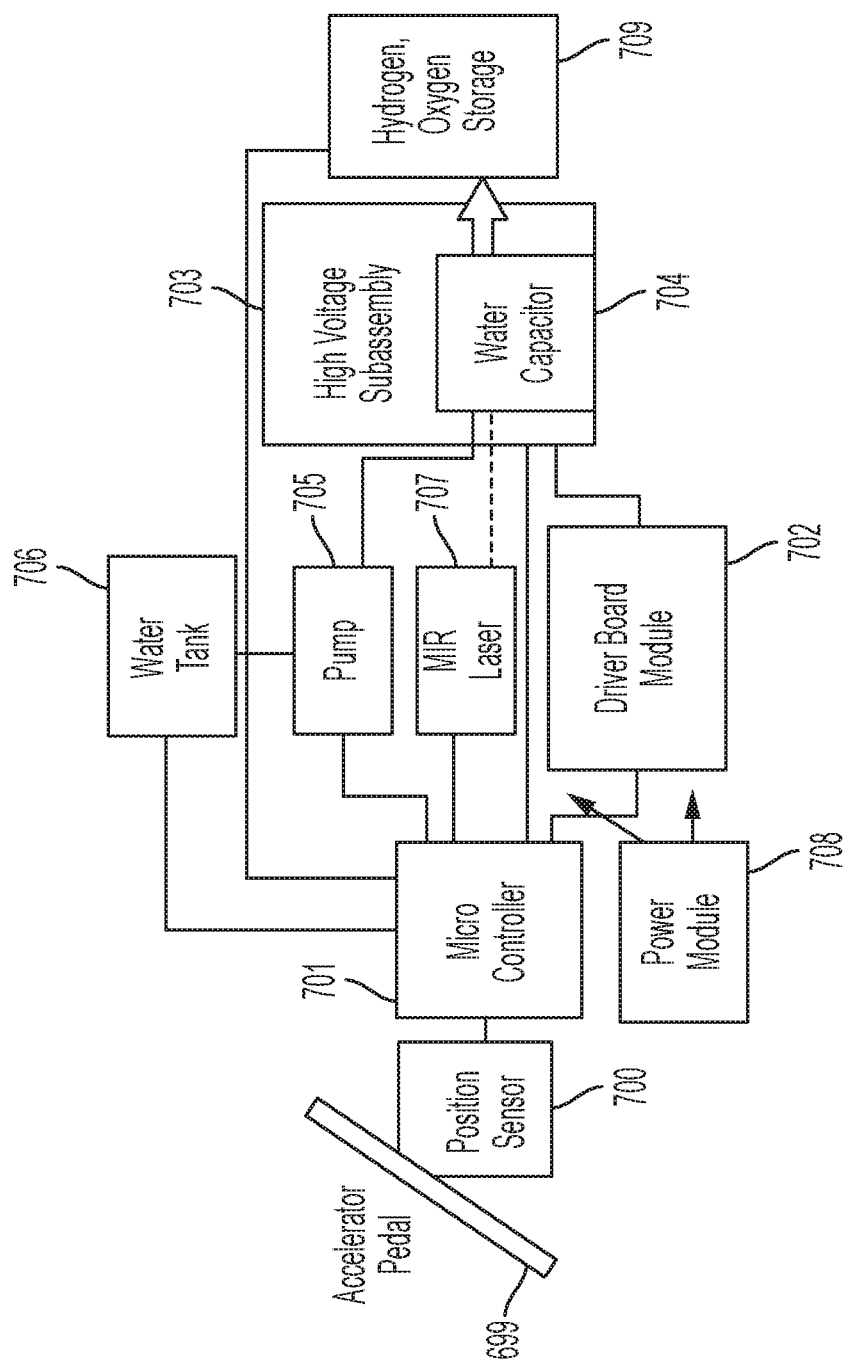
FIG. 8 depicts one embodiment of the high efficiency hydrogen oxygen generation system according to the present invention.

Referring now to FIG. 8, one embodiment of the high efficiency hydrogen oxygen generation system of the present invention is shown. The microcontroller board 701 and its software algorithms are the brains of the system. When the accelerator pedal 699 is pressed, the accelerator pedal position sensor 700 feeds into the microcontroller 701, which responds to the demand by sensing the level in the water tank 706, then pulsing the pump 705 for the proper duration to fill the water capacitor 704, then firing the driver board module 702 and the MIR laser 707 at the proper delay interval to synchronize their outputs to the water capacitor 704 and High Voltage subassembly 703. It should be understood by those skilled in the art that using an MIR laser is only one means of pre-stressing the water molecules, and that in other embodiments, the pre-stressing may be accomplished by alternate means, such as by heating the molecules using a heating coil. The system of the present invention can utilize a range of temperatures from about 10° C. to about 90° C. in order to influence the ion concentration in the water.

The hydrogen and oxygen gases flow out of the water capacitor 704 into the collection or storage chamber 709. The amount of hydrogen and oxygen generated is dependent on the number of pipes in the array and their length. The water in between the inner rod and outer pipe is dissociated on each pulse burst of high voltage and MIR laser 707. In an embodiment, the pipes in the array are wired in parallel, so that each pair of pipes receives maximum voltage. In at least one embodiment, the hydrogen and oxygen are separated by density such as by using a tent-shaped collector in the collection chamber 709, where the hydrogen moves to the top and the oxygen creates a layer at the bottom of the collection chamber 709.

In another embodiment, the hydrogen and oxygen are separated and accelerated using dual Ionic Propeller meshes for sparse screen electrodes: a pulsed positive voltage screen to attract oxygen and repel hydrogen, and a pulsed negative voltage screen to attract hydrogen and repel oxygen.

The hydrogen produced "on-demand" can then be used, for example, in a fuel cell that generates electricity for an EV vehicle. In other embodiments, the HOGS of the present invention is part of a larger system, wherein a plurality of capacitors may be used in connection with a water tank of predetermined size, for example at an EV charging station to generate enough hydrogen to "charge" one or more EV vehicles before more water needs to be added to the tank. Dependent upon the size of the system, other implementations of the HOGS of the present invention include powering homes, businesses, factories, planes, or ships, for example.

Completing the system is the power module 708 that supplies power to all the other subassemblies. In its simplest form, power module 708 may be a 12 Volt car battery. In at least one embodiment, power module 808 supplies logic level voltages and intermediate voltages up to +/−450 Volts for the driver board 702 which uses 900 Volt GaN FETs to drive the bipolar high voltage step-up transformer, which uses multi-filar Litz wire to increase resistance and inductance on the primary coil so that fewer turns may be used. In an embodiment, the turns ratios can be up to 1000-to-1.

It should be understood by those skilled in the art that the voltage source can be output in either a pulsed or continuous mode operation; however, a pulsed voltage source is preferred because of the lower power consumption required, as an objective of the present invention is to get as much hydrogen out using as little energy consumption as possible. A pulsed voltage source can be more easily synchronized with the MIR laser pulses; however, a continuous voltage source (e.g., a 1.5 MHz sine wave), combined with MIR laser pulses having a pulse width of around 350 μs would imply that 525 cycles of a continuous 1.5 MHz waveform would overlap with the laser pulse. It should be understood by those skilled in the art, however, that in the preferred pulsed output mode embodiment, depending on what the PID loop determines is required to reach the threshold, the number of pulses could approach a "continuous" output for a brief period in some cases.

Figure 9:
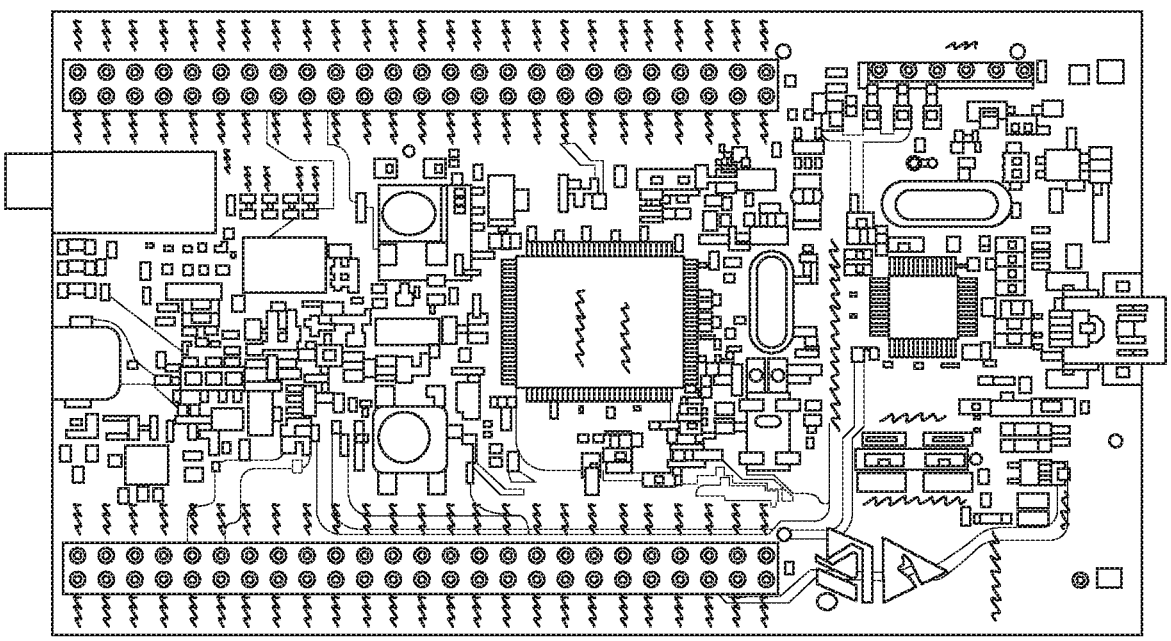
FIG. 9 depicts an exemplary microcontroller of the high efficiency hydrogen oxygen generation system according to the present invention.

FIG. 9 depicts an exemplary microcontroller module 701. In an embodiment, microcontroller 701 contains an ARM® Cortex®-M4 32-bit core with one Mbyte Flash memory and 192-Kbyte RAM; however, it should be understood by those skilled in the art that the present invention is not limited to these specifications.

Figure 10:
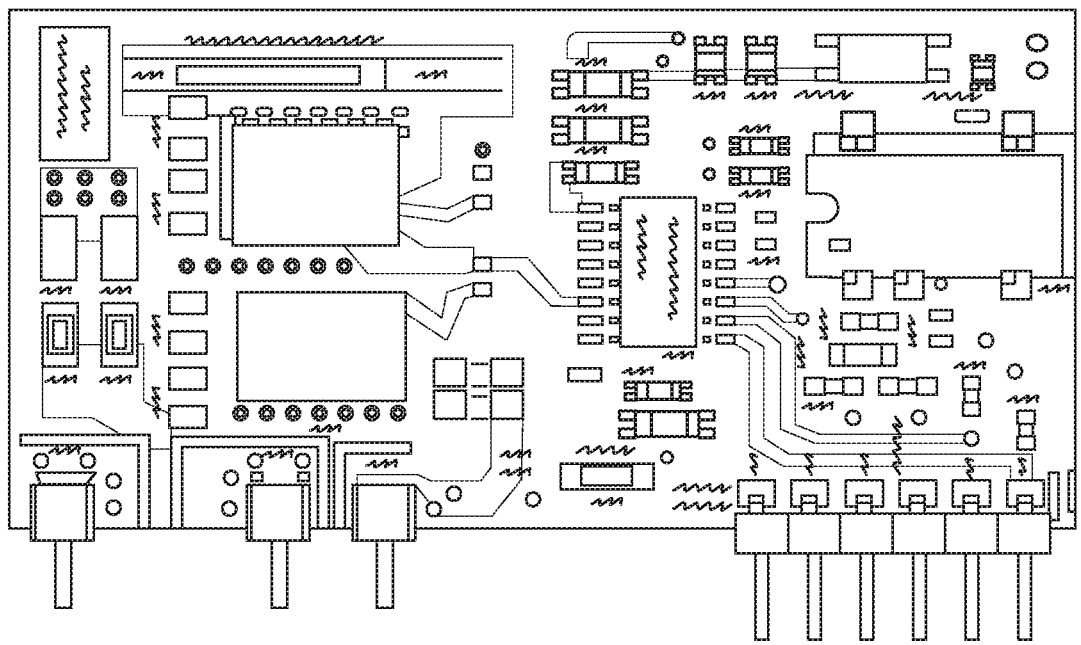
FIG. 10 depicts an exemplary driver board of the high efficiency hydrogen oxygen generation system according to the present invention.

FIG. 10 depicts an exemplary driver board module 702. In a preferred embodiment, driver board 702 contains high voltage, fast switching Gallium Nitride Field Effect Transistors (GaN FETs); however, it should be understood by those skilled in the art that other types of transistors, such as Silicon Carbide (SiC) or possibly even Insulated Gate Bipolar Transistors (IGBT), are not precluded.

Figure 12:
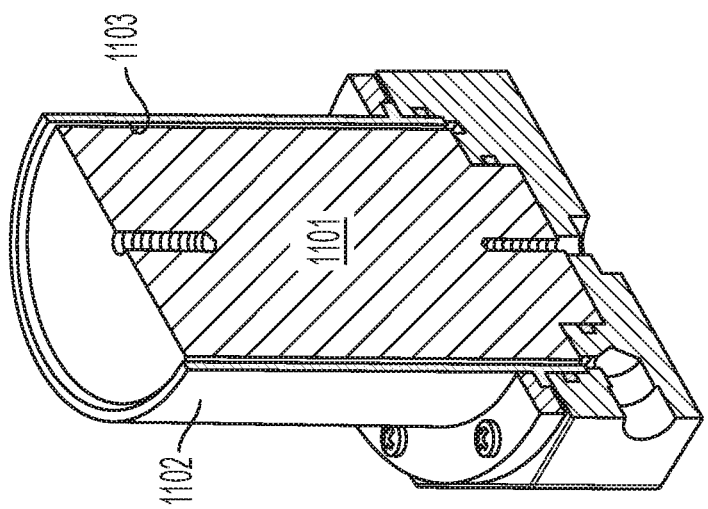
FIG. 12 depicts a cross-sectional view of the water capacitor of FIG. 11, taken along line A-A.
Figure 11:
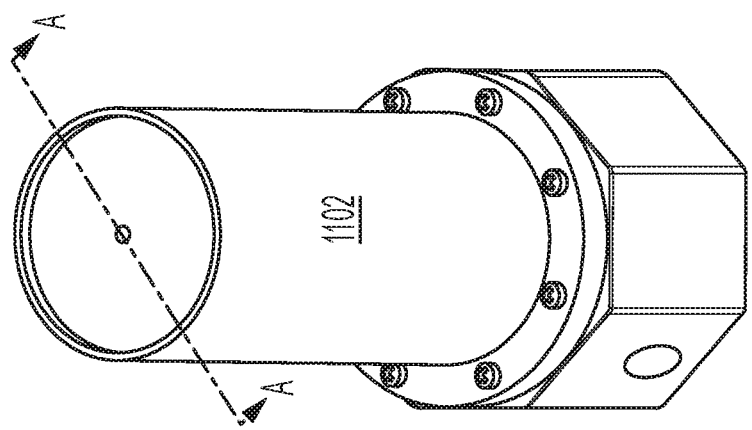
FIG. 11 depicts a perspective view of one embodiment of a water capacitor of the high efficiency hydrogen oxygen generation system according to the present invention.

Referring now to FIGS. 11 and 12, one embodiment of the water capacitor 704 according the present invention is shown. This is where the water molecules are dissociated and the hydrogen and oxygen are actually generated. Water capacitor 704 comprises a rod 1101 concentrically-mounted inside a tube or pipe 1102 having a diameter slightly larger than the diameter of the rod. As shown in FIG. 12, in an embodiment, there is a gap 1103 between the inner surface of the tube or pipe and the outer surface of the rod, which may be approximately 1 mm. When the accelerator pedal 699 is pressed, microcontroller 701 senses the accelerator pedal position sensor 700 and the water level in the water tank 706 and pulses the pump 705 to fill the gap in the water capacitor 704 between the rod 1101 and tube or pipe 1102. The water enters at the bottom of the water capacitor 704, swirling to fill the gap 1103, just prior to every "pop". Microcontroller 701 then pulses the driver board module 702 and MIR laser 707 at the proper timing skew to assure simultaneous output to the water capacitor 704. The wires are Common and High Voltage AC pulsed being driven by a custom step-up transformer in the High Voltage subassembly 703 via pulse packets from the driver board module 702. In an embodiment, microcontroller 701 includes a direct digital synthesizer, such as the Analog Devices' AD9859 400 MSPS 10-Bit DAC 1.8 V CMOS Direct Digital Synthesizer, for varying the frequency of the pulse packet using a PID loop to achieve convergence to maximize output. In an embodiment, the frequency can vary anywhere from about 100 kHz to about 100 MHz, and the peak voltage is in the range from about 20 kV to about 100 MV.

The GaN FETs Half Bridge Driver Board 702 converts a CMOS or TTL level pulse packet of 1.5 MHz pulses into a bipolar RZ+/−450 Volt pulse packet driving a step-up transformer. This pulse packet is transmitted on-demand to replenish the gas supply. VDD and VEE are variable up to +/−450 Volts, producing a high voltage output of up to Megavolts. It should be understood by those skilled in the art that while 1.5 MHz pulses in the medium frequency range are described as being effective, pulses in the high frequency range (3 MHz to 300 MHz) may also be used.

Figure 13A:
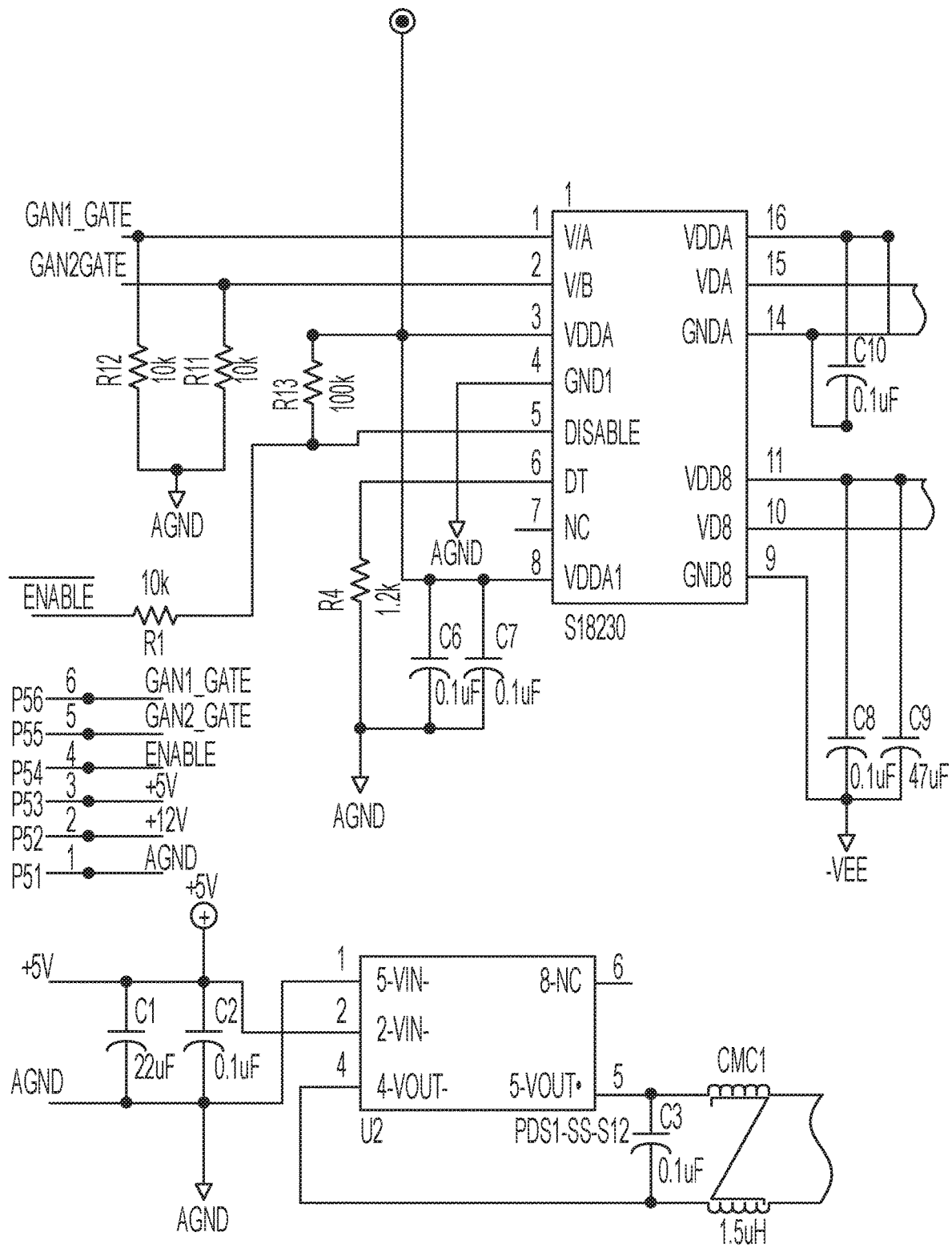
FIG. 13 depicts a schematic of the driver board of FIG. 10.
Figure 13:
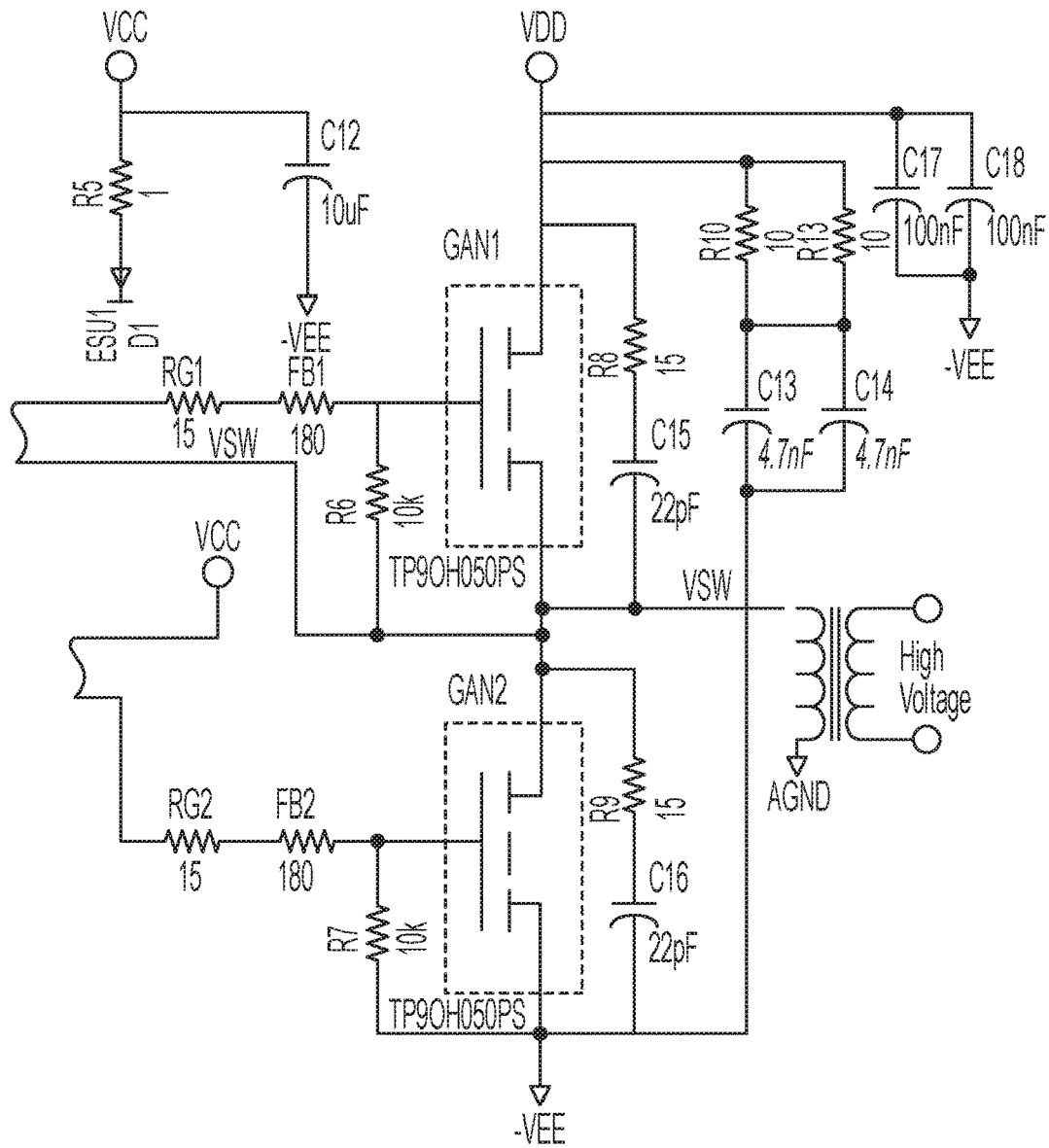
Figure 13:
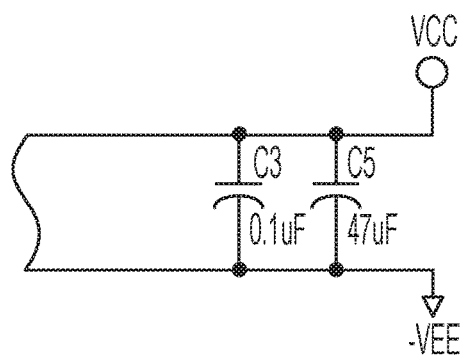

FIG. 13 is a detailed schematic of an exemplary embodiment of the driver board 702. VDD may range up to +450 VDC and VEE may be as low as −450 VDC.

FIG. 14 is a high level overview schematic of one embodiment of the circuitry of the HOGS of the present invention. There are several water injection ports on the base of the water capacitor 704 entering between the cylinder 1102 and rod 1101 at 45-degree angles to create maximum vortex to clear out residual gases. Pump 705 may be a high-powered pulsed gear pump. The system may be triggered automatically at certain preset intervals or it may be triggered on-demand, for instance by an accelerator pedal throttle position sensor in an EV automobile. Alternatively, the system may be triggered at a certain threshold level of gases remaining in the collection or storage chamber 709 to replenish them. In a preferred embodiment, the inside of the cylinder 1102 and outside of the rod 1101 are flash plated with platinum, and/or flash copper and then platinum flash plating on top of the copper. The platinum outer coating acts as a catalyst to evolve diatomic hydrogen and oxygen gas and improves dissociation. In an embodiment, a current sensor may be used to monitor the current in the system, and one or more temperature sensors may be used to sense the water temperature, as well as ambient temperature.

Figure 15:
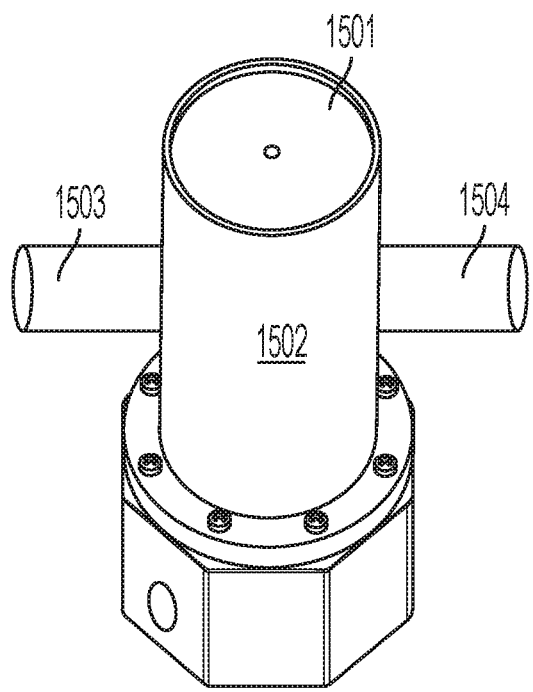
FIG. 15 depicts a perspective view of another embodiment of a water capacitor of high efficiency hydrogen oxygen generation system according to the present invention, with diametrically opposed magnets positioned on the exterior surface of the cylinder.
Figure 16:
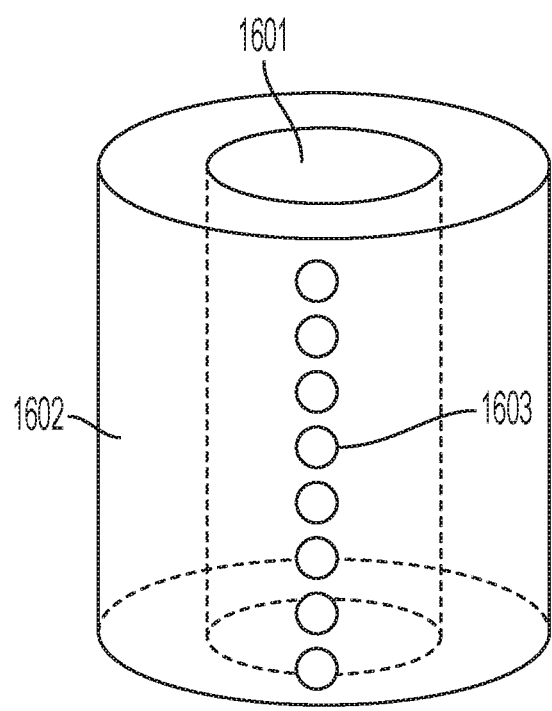
FIG. 16 depicts a perspective view of yet another embodiment of a water capacitor of high efficiency hydrogen oxygen generation system according to the present invention, with radially positioned magnets embedded in the outer cylinder.
Figure 17A:
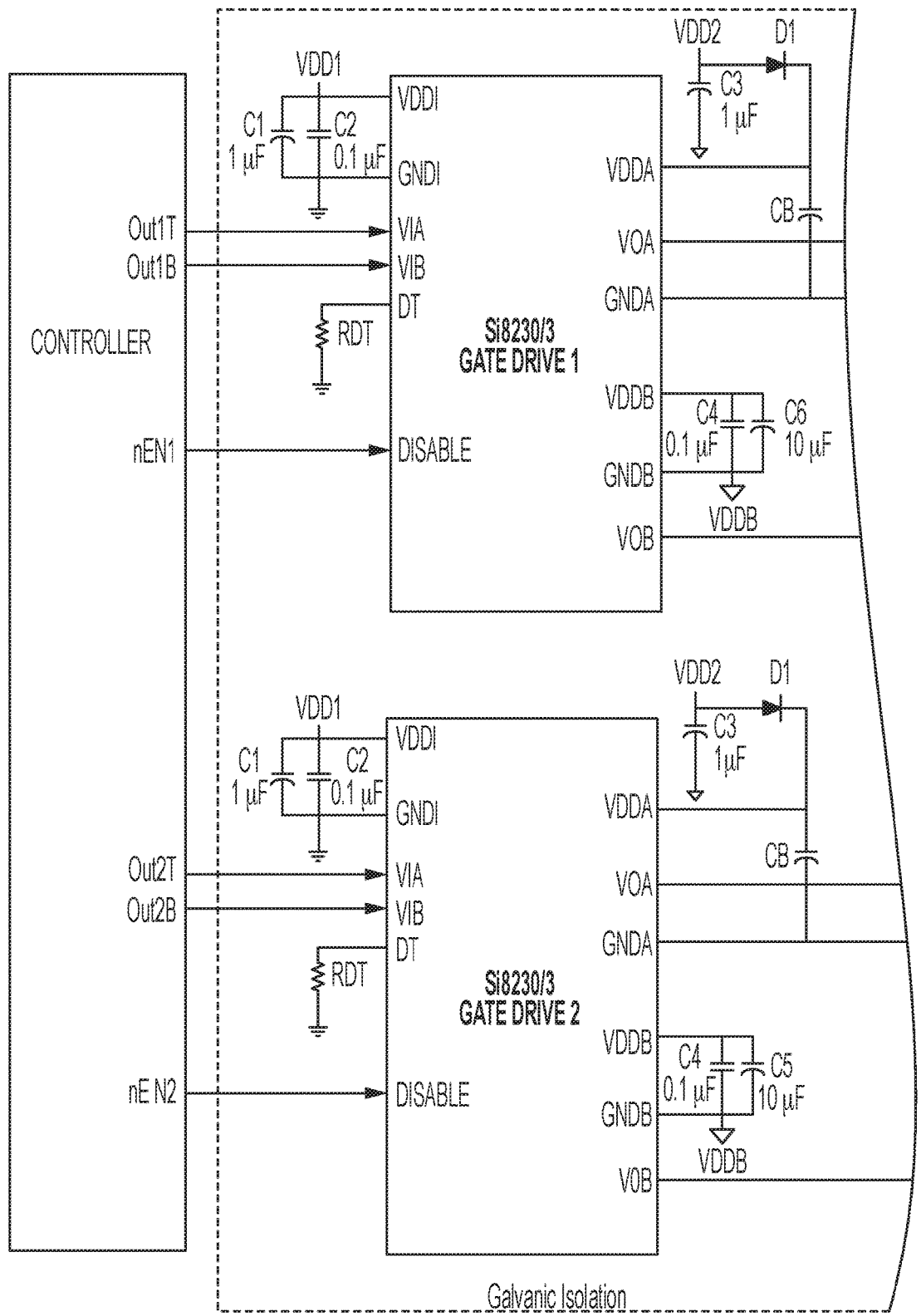
FIG. 17 depicts a schematic of another exemplary driver board according to the present invention, using a full bridge circuit.
Figure 17B:
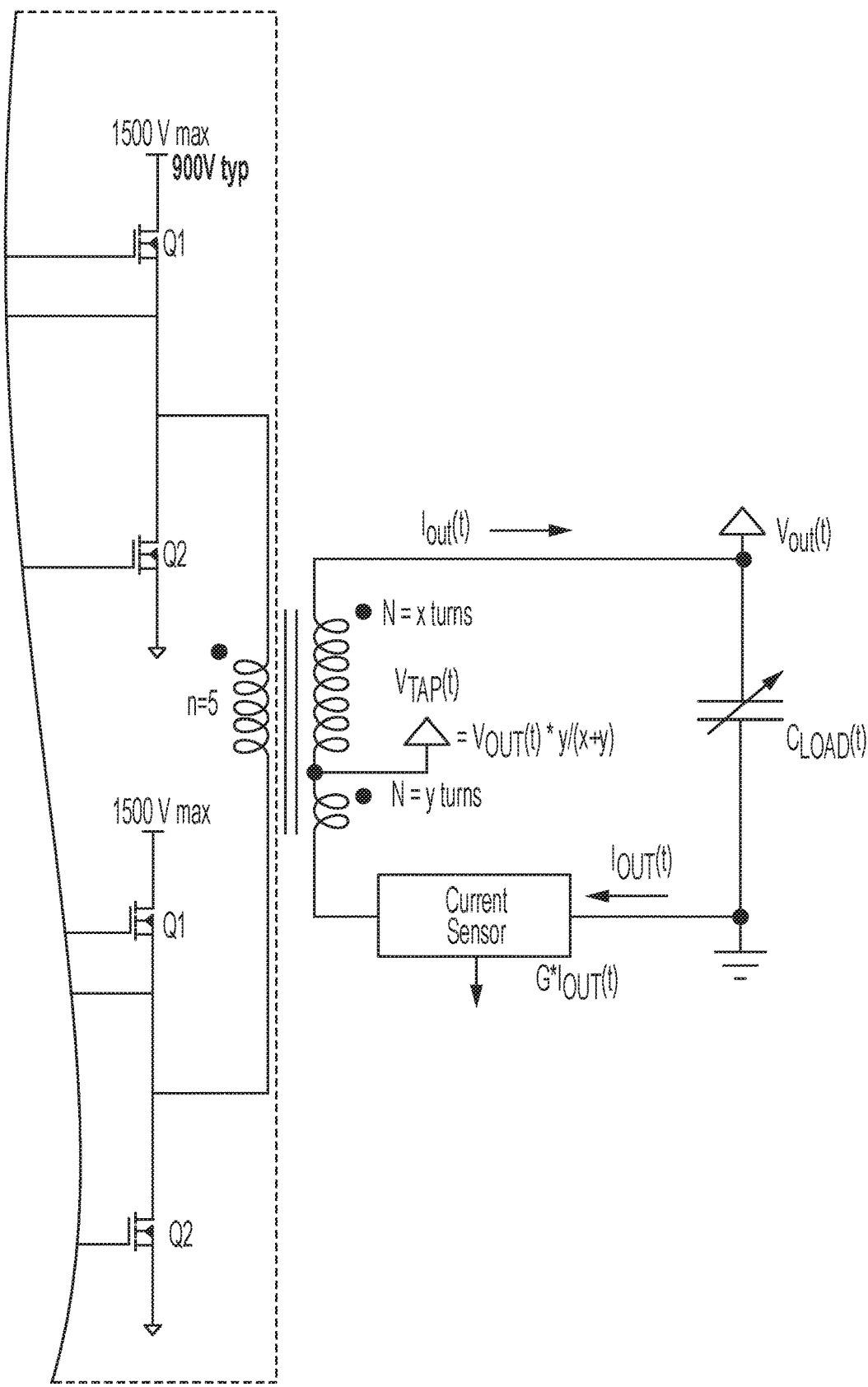

As shown in FIG. 15, neodymium (NdFeB) magnets may be used, which can create magnetic fields up to 2 Tesla in close proximity. In an embodiment, an oversized one-inch thick Aluminum tube 1501 large enough to fit over the entire cylinder rod subassembly is used and diametrically opposing holes large enough to friction fit magnets 1503, 1504 are drilled into the outer skin, where the magnets attract each other across the diameter of the cylinder. In another embodiment, as shown in FIG. 16, a custom radially positioned, polarized magnet set 1603 may be used and embedded into the pipe 1601 and contained inside the rod. The magnetic field is focused radially, attracting diametrically across the cylinder. In one embodiment, the outside of the cylinder is grounded and the rod in the center is pulsed with medium or high frequency Megavolt pulses. The E field creates an emf force field across the water. The objective is to boil the water molecules around violently to prevent breakdown current flow. Current can flow a few microns to a few hundreds of microns, but result in minimal closed loop current. The molecules and ions are misdirected and churning until the molecules break apart. One cycle delivers sufficient energy to break one set of bonds (e.g., H and O—H bond) and a subsequent cycle delivers sufficient energy to break the other set of bonds (e.g., O—H bond).

In a full bridge embodiment (FIG. 17), the rod is not grounded. Split phases are applied to the rod and cylinder to double the voltage. The two half bridges operate 180 degrees out of phase: the rod gets one phase and the cylinder gets the other phase.

Figure 18:
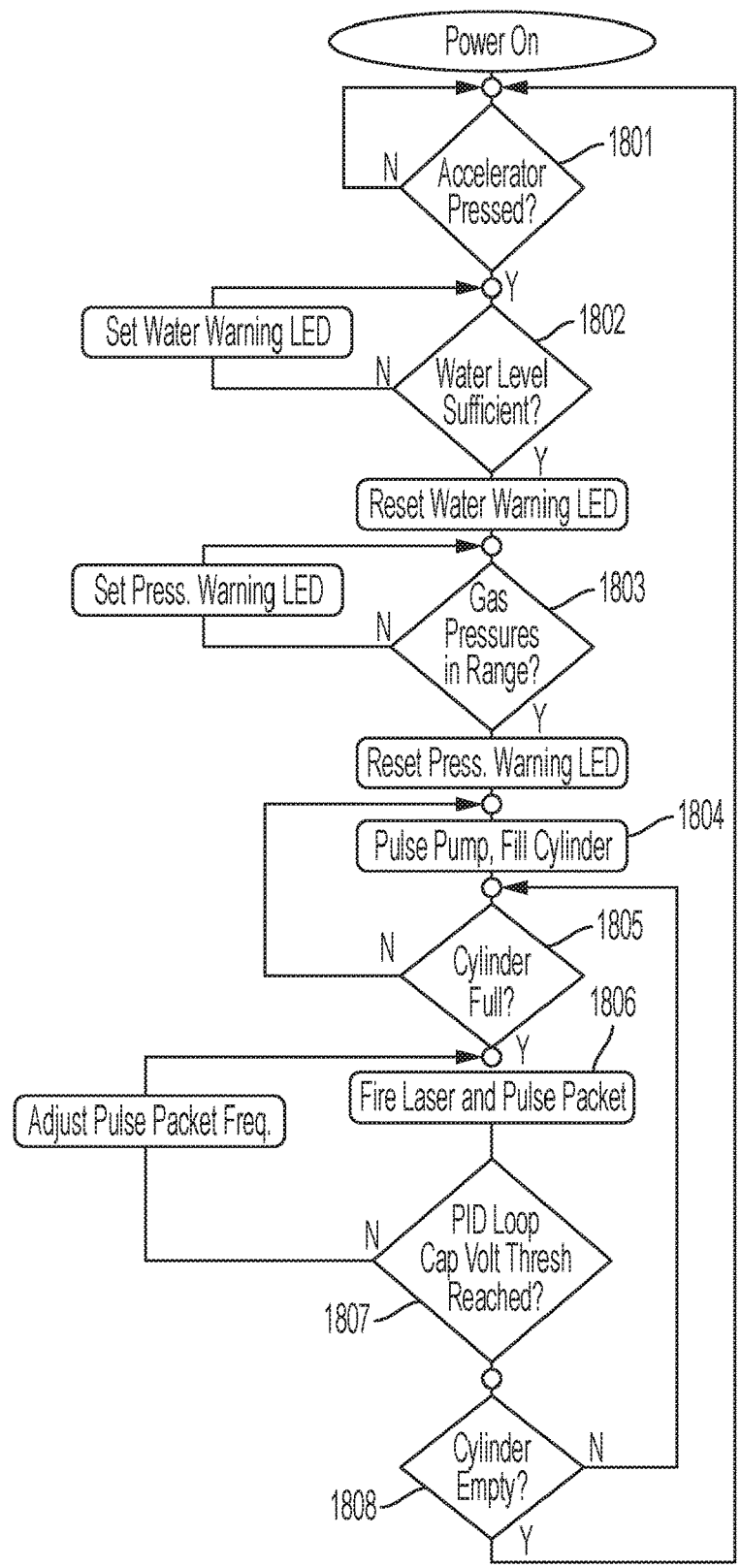
FIG. 18 depicts a flowchart of the method of dissociation of hydrogen and oxygen from a water molecule according to an embodiment of the present invention.

FIG. 18 shows a flowchart of the method of dissociation of hydrogen and oxygen from a water molecule according to an embodiment of the present invention. At step 1801, the accelerator pedal, such as an accelerator pedal in an EV automobile, is pressed, and the accelerator pedal position sensor feeds into the microcontroller, which responds to the demand by sensing the level in the water tank (step 1802). After determining that the gas pressures are in range (step 1803), the microcontroller pulses the pump for the proper duration to fill the water capacitor (steps 1804 and 1805), then fires the driver board module and the MIR Laser at the proper delay interval to synchronize their outputs to the water capacitor and High Voltage subassembly, while determining whether the PID loop voltage threshold has been reached (steps 1806 and 1807). Both the pulse packet frequency and number of pulses can be adjusted, as necessary. The hydrogen and oxygen gases then flow out of the water capacitor 704 into the collection or storage chamber 709 (step 1808).

An embodiment of the high efficiency hydrogen oxygen generation system of the present invention may take the form of a hardware embodiment that uses software (including firmware, resident software, micro-code, etc.). Furthermore, an embodiment may take the form of a computer program product on a tangible computer-usable storage medium having computer-usable program code embodied in the medium. A memory device can form the medium. Computer program code or firmware to carry out an embodiment of the present disclosure could also reside on optical or magnetic storage media, especially while being transported or stored prior to or incident to the loading of the computer program code or firmware into the microcontroller. This computer program code or firmware can be loaded, as an example, by connecting a computer system to the programming interface.

It should be appreciated and understood that the present invention may be embodied as systems, methods, apparatus, computer readable media, non-transitory computer readable media and/or computer program products. The present invention may take the form of an entirely hardware embodiment, or an embodiment combining software and hardware aspects that may all generally be referred to herein as a "circuit," "module," "system," or "processor" configured to practice the methods or systems of the invention. The present invention may partially take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Scala, Ruby, Python, Smalltalk, C++ or the like and conventional procedural programming languages, such as the "C" programming language or similar programming languages. The program code may execute entirely on a computing device (such as, a computer), partly on a computing device, as a stand-alone software package, partly on a user's computing device and party on a remote computing device or entirely on the remote computing device or server. In the latter scenario, the remote computing device may be connected to the user's computing device through any type of network, including a local area network (LAN), a wide area network (WAN), or a wireless local area network (WLAN), or the connection may be made to an external computing device (for example, through the Internet using an Internet Service Provider).

The methods of operation of the present invention may be implemented by computer program instructions. These computer program instructions may be provided to a processor of a general purpose computing device (such as, a computer), special purpose computing device, or other programmable data processor or processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in a flowchart and/or block diagram block or blocks.

Thus, the present invention achieves one or more of the following advantages. The present invention provides an improved means for dissociating hydrogen and oxygen from water molecules to produce hydrogen "on-demand," which can then be fed into and used in a fuel cell or as part of an energy system. The system is significantly more efficient than conventional electrolysis, and consumes far less energy.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of dissociating hydrogen and oxygen from a water molecule, comprising:
   isolating a predetermined volume of water between concentrically-mounted electrodes;
   applying a magnetic field across the predetermined volume of water, the magnetic field focused radially and attracting diametrically across the electrodes;
   exciting water molecules in the isolated volume of water to a resonant harmonic frequency;
   synchronously applying short burst high voltage, medium to high frequency AC pulse packets to the isolated volume of water to create an electric field, the AC pulse packets having a burst width of up to 1 millisecond and a voltage of at least 1 MV and up to 10 MV, the AC pulse packets generating an oscillating electromotive force acting on the excited water molecules; and
   dissociating hydrogen and oxygen from the excited water molecules as a result of the oscillating electromotive force.

2. The method of claim 1 wherein the step of exciting water molecules in the isolated volume of water comprises:
   synchronously pulsing the isolated volume of water with a 1 to 6 micron MIR laser.

3. The method of claim 1 wherein the step of exciting water molecules in the isolated volume of water comprises:
   heating the molecules using a heating coil to a temperature up to 90° C.

4. The method of claim 1 wherein the magnetic field is between 1 Tesla to 2 Tesla, and the electric field is between 1 MV/mm to 10 MV/mm.

5. The method of claim 1 wherein the concentrically-mounted electrodes comprise a rod having an outer diameter disposed within a pipe or tube having an inner diameter larger than the outer diameter of the rod, and wherein the predetermined volume of water is isolated between the rod outer diameter and pipe inner diameter.

6. The method of claim 1 further including a plurality of concentrically-mounted electrodes wired in parallel.

7. The method of claim 1 further comprising:
   changing the AC pulse packet frequency in real-time using a closed loop control technique; and
   adjusting the AC pulse packet frequency to a resonant frequency of the water molecules.

8. The method of claim 1 further comprising using a transformer or cascaded tuned LC circuits driven by the AC pulse packets to step up the voltage.

9. The method of claim 1 wherein the frequency of the AC pulse packets is varied using a PID loop to achieve convergence to maximize output.

10. The method of claim 1 further including separating the dissociated hydrogen and oxygen in a storage chamber, wherein the step of separating the dissociated hydrogen and oxygen in the storage chamber comprises:
    separating the hydrogen and oxygen by density using a tent-shaped collector disposed within the storage chamber.

11. A method of dissociating hydrogen and oxygen from a water molecule, comprising:
    isolating a predetermined volume of water between concentrically-mounted electrodes;
    applying a magnetic field across the predetermined volume of water, the magnetic field focused radially and attracting diametrically across the electrodes;
    exciting water molecules in the isolated volume of water to a resonant harmonic frequency;
    synchronously applying short burst high voltage, medium to high frequency AC pulse packets to the isolated volume of water to create an electric field, the AC pulse packets having a burst width of up to 1 millisecond and a voltage of up to 10 MV, the AC pulse packets generating an oscillating electromotive force acting on the excited water molecules;
    dissociating hydrogen and oxygen from the excited water molecules as a result of the oscillating electromotive force; and
    separating the dissociated hydrogen and oxygen in a storage chamber comprising dual ionic propeller meshes by pulsing a positive voltage screen electrode to attract oxygen and repel hydrogen, and
    pulsing a negative voltage screen electrode to attract hydrogen and repel oxygen.

12. A high efficiency hydrogen oxygen generation system comprising:
    a means to generate short burst medium to high frequency AC pulse packets up to 1 millisecond total burst width of at least 1 MV and up to 10 MV synchronized with pulses from a 1 to 6 micron MIR laser to excite a water column approximately 1 mm thick inside concentric pipe electrodes, generating an avalanche of hydrogen and oxygen gases.

13. The high efficiency hydrogen oxygen generation system of claim 12 further comprising:
    a means to apply a magnetic field across the water column, the magnetic field focused radially and attracting diametrically across the concentric pipe electrodes.

14. The high efficiency hydrogen oxygen generation system of claim 13 wherein the magnetic field is between 1

Tesla to 2 Tesla, and the short burst medium to high frequency AC pulse packets generate an electric field between 1 MV/mm to 10 MV/mm.

15. The high efficiency hydrogen oxygen generation system of claim 12 further including a plurality of concentric pipe electrodes wired in parallel.

16. The high efficiency hydrogen oxygen generation system of claim 12 further comprising:
   a means to separate the hydrogen and oxygen gases in a storage chamber.

17. The high efficiency hydrogen oxygen generation system of claim 12 further comprising:
   a means to change the AC pulse packet frequency and duration in real-time and adjust the frequency to the resonant frequency by utilizing a microprocessor, software, PID loop, digital potentiometers, voltage sensors, current sensors, temperature sensors, and Direct Digital Synthesizers, in a closed loop control technique and methodology.

18. A high efficiency hydrogen oxygen generation system, comprising:
   a predetermined volume of water isolated between concentrically-mounted electrodes;
   a means to apply a magnetic field across the predetermined volume of water, the magnetic field focused radially and attracting diametrically across the electrodes;
   a means to excite water molecules in the isolated volume of water to a resonant harmonic frequency; and
   a means to synchronously apply short burst high voltage, medium to high frequency AC pulse packets to the isolated volume of water to create an electric field, the AC pulse packets having a burst width of up to 1 millisecond and a voltage of at least 1 MV and up to 10 MV the AC pulse packets generating an oscillating electromotive force acting on the excited water molecules to dissociate hydrogen and oxygen.

* * * * *

UNITED STATES PATENT AND TRADEMARK OFFICE
CERTIFICATE OF CORRECTION

PATENT NO. : 11,291,972 B2
APPLICATION NO. : 16/887533
DATED : April 5, 2022
INVENTOR(S) : Edward L. Davis It is certified that error appears in the above-identified patent and that said Letters Patent is hereby corrected as shown below:

In the Specification

Column 2, Line 5, change "100 μm apart" to "100 pm apart"
Column 2, Line 16, change "=57.02 μm." to "=57.02 pm"
Column 2, Line 25, change "57 μm apart" to "57 pm apart"
Column 6, Line 47, change "3400 cm' in" to "3400 cm$^{-1}$ in"
Column 10, Line 20, change "Analog Devices' AD9859" to "Analog Devices™ AD9859"

Signed and Sealed this
Fifth Day of September, 2023

Katherine Kelly Vidal
*Director of the United States Patent and Trademark Office*